(12) United States Patent
Mao et al.

(10) Patent No.: US 8,528,960 B2
(45) Date of Patent: Sep. 10, 2013

(54) VEHICLE ROOF RETRACTING DEVICE AND VEHICLE HAVING THE SAME

(75) Inventors: Dehe Mao, Shenzhen (CN); Hu Man, Shenzhen (CN); Hongfei Yan, Shenzhen (CN); Yi Qin, Shenzhen (CN); Tao Liu, Shenzhen (CN)

(73) Assignee: BYD Company Limited (CN)

( * ) Notice: Subject to any disclaimer, the term of this patent is extended or adjusted under 35 U.S.C. 154(b) by 207 days.

(21) Appl. No.: 13/121,185

(22) PCT Filed: Sep. 24, 2009

(86) PCT No.: PCT/CN2009/074198
§ 371 (c)(1),
(2), (4) Date: Mar. 25, 2011

(87) PCT Pub. No.: WO2010/034248
PCT Pub. Date: Apr. 1, 2010

(65) Prior Publication Data
US 2011/0187149 A1 Aug. 4, 2011

(30) Foreign Application Priority Data
Sep. 27, 2008 (CN) .......................... 2008 1 0148811

(51) Int. Cl.
*B60J 7/20* (2006.01)
(52) U.S. Cl.
USPC ............. 296/107.08; 296/107.16; 296/136.06
(58) Field of Classification Search
USPC ............. 296/107.08, 107.16, 107.17, 136.05, 296/136.06
See application file for complete search history.

(56) References Cited

U.S. PATENT DOCUMENTS

| 6,293,605 | B2 |   | 9/2001  | Neubrand |
| 6,832,804 | B2 |   | 12/2004 | Eichholz et al. |
| 7,377,574 | B2 | * | 5/2008  | Richter et al. ........... 296/107.15 |
| 7,455,346 | B2 | * | 11/2008 | Kostadinov .............. 296/107.08 |
| 7,585,012 | B2 | * | 9/2009  | Kostadinov .............. 296/107.01 |
| 7,597,380 | B1 | * | 10/2009 | Adjwok ................... 296/107.08 |
| 7,690,717 | B2 | * | 4/2010  | Baumeier ................ 296/136.06 |

(Continued)

FOREIGN PATENT DOCUMENTS

| CN | 2880565   | Y | 3/2007 |
| CN | 101186179 | A | 5/2008 |
| CN | 201291742 | Y | 8/2009 |

OTHER PUBLICATIONS

International Search Report for International Application No. PCT/CN2009/074198 (4 pages).

*Primary Examiner* — Jason S Morrow
(74) *Attorney, Agent, or Firm* — Squire Sanders (US) LLP

(57) ABSTRACT

A vehicle roof retracting device comprises a guiding mechanism, a rear shelf, a principal shaft, an adjusting lever, an initiative lever, and a connecting lever. The guiding mechanism of the roof rotates around the principal shaft for actuating the roof to displace between a closed position and a retracted position. The rear shelf provides a space for the passage of the roof when it is opened and conceals a gap between the roof and the trunk cover when it is closed. The adjusting lever is connected to an extension extending transversely from one end of the guiding mechanism and actuated by the extension to rotate around the principal shaft. A protruding part of the adjusting lever is engaged with or disengaged from the initiative lever for rotating the initiative lever around said principal shaft. The connecting lever is configured to connect the initiative lever and the rear shelf for displacing the rear shelf between the open position and the closed position.

34 Claims, 5 Drawing Sheets

(56) References Cited

U.S. PATENT DOCUMENTS

| | | | |
|---|---|---|---|
| 2004/0145210 A1* | 7/2004 | Fuchs et al. | 296/107.08 |
| 2004/0178656 A1* | 9/2004 | Hahn | 296/107.08 |
| 2007/0035146 A1* | 2/2007 | Baumeier | 296/24.44 |
| 2007/0040410 A1* | 2/2007 | Baumeier | 296/136.06 |
| 2007/0182200 A1* | 8/2007 | Baumeier et al. | 296/107.08 |
| 2007/0236043 A1* | 10/2007 | Kostadinov | 296/108 |
| 2008/0203758 A1* | 8/2008 | Brockhoff | 296/107.07 |
| 2009/0066111 A1* | 3/2009 | Kostadinov | 296/108 |

* cited by examiner

VEHICLE ROOF RETRACTING DEVICE AND VEHICLE HAVING THE SAME

CROSS-REFERENCE TO RELATED APPLICATION

This application claims priority to Chinese Patent Application No. 200810148811.0, filed on Sep. 27, 2008, the entire disclosure of which is incorporated herein by reference.

FIELD OF THE INVENTION

The present invention relates to vehicles, and, more particularly, to roof retracting devices and vehicles fitted with said devices.

BACKGROUND OF THE INVENTION

Along with social and economic development, people pay more attention to the quality of life. And, vehicles fitted with retractable hard tops become increasingly popular. Such vehicle roofs should ensure the sealed condition in the closed position in order to have all-weather suitability. Also, the roofs should be safe and stable during operation.

Compared with vehicles fitted with at least triple-collapsed roofs, vehicles fitted with double-collapsed roofs are simpler in configuration, but they need longer trunks to accommodate them. But, it is more difficult to drive a vehicle with longer trunks. Thus, a roof retracting device is needed to retract a longer roof into a trunk as short as possible and ensure the sealing performance.

A retractable hard top is disclosed in Chinese patent publication No. CN1293122A. The retractable hard top comprises an upper roof section and a rear roof section which is connected to the upper roof section via a rod assembly. When the roof is pivoted into the retracted position, the upper roof section can move into the interior of the rear roof section and retracts into the accommodation space together with the rear roof section. This patent does not take into account the sealing performance when the roof is in the closed and retracted position.

A retractable hard top of vehicle is disclosed in Chinese patent No. CN2880565Y. The hard top comprises a foundation, a first rod which is connected to the front of the foundation, a second rod which is connected to the rear of foundation, and a third rod which is connected between the first rod and the second rod. The second rod comprises a rear rod and a front rod connected with the rear rod. During operation, the hydraulic system actuates the roof to move between the closed position in which the roof is resting on the frame and the retracted position in which the roof retracts into a roof accommodation space. The patent also does not refer to a mechanism used to ensure sealing performance. Therefore, the vehicle fitted with the hard top does not meet the esthetic and aerodynamic needs.

Moreover, a retractable roof device and a vehicle fitted with the device are disclosed in the Chinese patent publication No. CN1750952A. The retractable roof device comprises a rear cover. The rear cover comprises a rear shelf and two closure flaps positioned on both sides of the rear shelf. The rear cover can be opened in order to make space for the passage of the roof and the guiding means of the roof when the roof is displaced between the closed position and the retracted position. And, the rear cover can conceal the gap when the roof is in the closed position or in the detracted position. The rear cover operates together with the roof. In detail, the extension of the guiding means of the roof causes rotation of a cam of a principal axis. Then the cam actuates the rear cover to move via a L-shaped lever. With continuous rotation of the guiding means of the roof, the extension of the guiding means comes into contact with a pulley nested on the principal axis and causes the pulley to rotate. The rotation of the pulley generates a tractive force on a cable which is fixed to the pulley. At the other end of the cable, this tractive force acts on an actuating mechanism of the closure flaps and further causes opening or closing of the closure flaps. But a vehicle fitted with this retractable roof device has many disadvantages. First, the fact that the start points of the parts are not concurrent and the cable comes out of the preset track result in damages such as a rupture of the rear shelf and stopage of the roof during operation. Second, the retractable roof device is complicated in configuration and needs to be manufactured and assembled with high accuracy. Third, it is difficult to adjust the relation between the trunk cover and the roof. Fourth, the operation of the retractable roof device is not stable.

SUMMARY OF THE INVENTION

The object of the present invention is to provide an improved roof retracting device which is simpler in structure, more reliable and stable in operation, and easier to adjust the relation between the rear shelf and the guiding means of the roof.

According to an embodiment of the present invention, a roof retracting device comprises a guiding means of the roof, a rear shelf, a trunk cover, and a principal shaft. The guiding means of the roof rotates around the principal shaft in order to actuate the vehicle roof to displace between the closed position and the retracted position. The rear shelf can be opened in order to make space for the passage of the roof and closed in order to conceal the gap between the vehicle roof and the trunk cover. The roof retracting device further comprises: an adjusting lever, which is connected to an extension configured to extend transversely from one end of the guiding means of the roof and is actuated by the extension to rotate around said principal shaft; an initiative lever, which is engagable and disengagable with a protruding part of the adjusting lever and is actuated by the lever to rotate around the principal shaft; and a connecting lever, which is connected between the initiative lever and the rear shelf to displace the rear shelf between the opened position and the closed position.

According to another embodiment of the invention, the present invention also provides a vehicle which comprises aforesaid roof retracting device.

In the present invention, the rear shelf operates harmoniously with the guiding means of the roof via the extension of the guiding means, the adjusting lever and the connecting lever. It is easy to adjust the relation between the rear shelf and the guiding means of the roof via the adjusting lever. Accordingly, the roof retracting device becomes more reliable and more stable.

BRIEF DESCRIPTION OF THE DRAWINGS

The aforementioned features and advantages of the invention as well as additional features and advantages thereof will be more clearly understood hereinafter as a result of a detailed description of embodiments when taken in conjunction with the drawings.

DETAILED DESCRIPTION OF THE EMBODIMENTS

Figure 1:
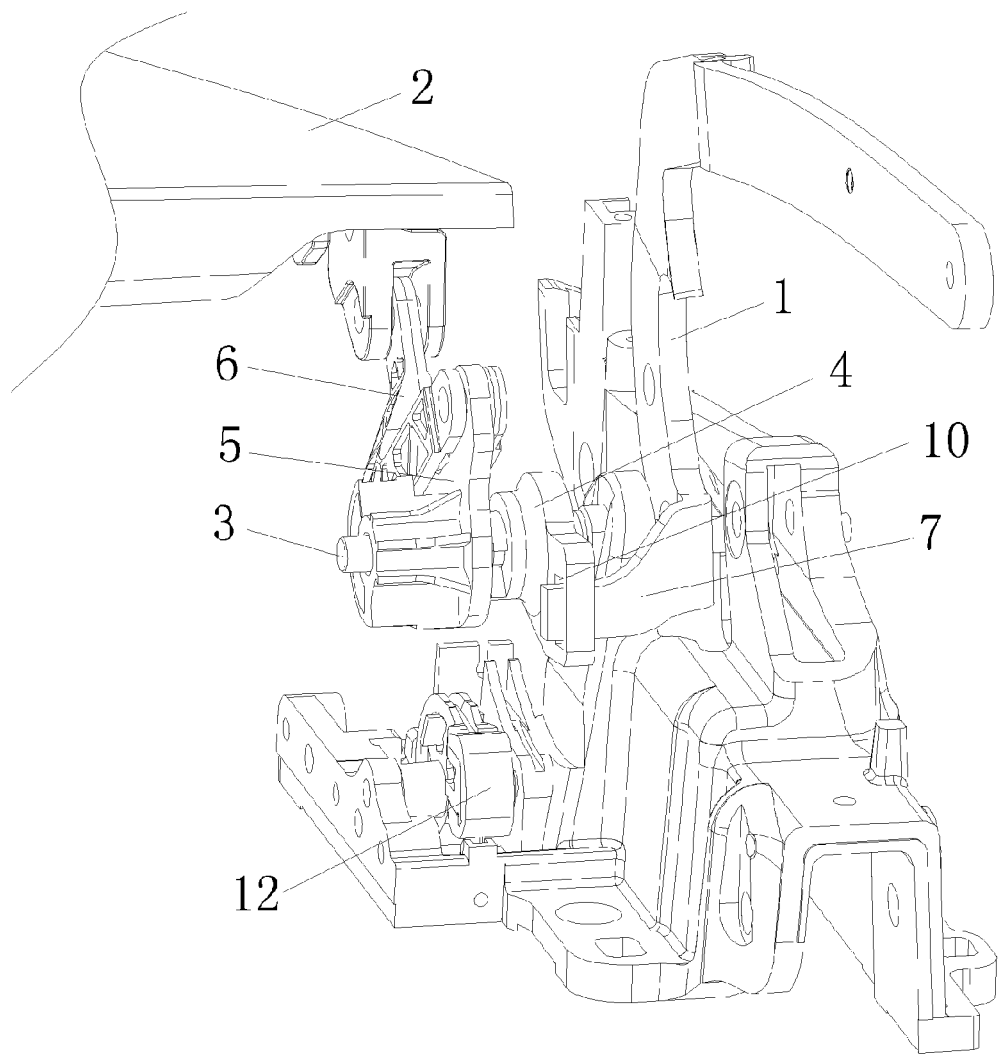
FIG. 1 is a perspective view illustrating an embodiment of the roof retracting device according to the present invention.

According to the embodiment of the invention, the roof retracting device comprises a guiding means 1 of the roof, a rear shelf 2, a trunk cover, and a principal shaft 3. The guiding means 1 of the roof rotates around the principal shaft 3 to actuate the vehicle roof to displace between the closed position and the retracted position. The rear shelf 2 can be opened to make space for the passage of the roof and closed to conceal the gap between the vehicle roof and the trunk cover. The roof retracting device also comprises an adjusting lever 4, an initiative lever 5, and a connecting lever 6. The adjusting lever 4 is connected to the extension 7 configured to transversely extend from one end of the guiding means 1 of the roof, and is actuated by the extension 7 to rotate around the principal shaft 3. The adjusting lever 4 has a protruding part 8 which can be engaged with and disengaged from the initiative lever 5 and drive the initiative lever 5 to rotate around the principal shaft 3. The connecting lever 6 is connected between the initiative lever 5 and the rear shelf 2 to drive the rear shelf 2 to be opened or closed.

The guiding means 1 of the roof is actuated by a hydraulic assembly or a pneumatic assembly to rotate around the principal shaft 3 such that the vehicle roof is actuated to displace between the closed position and the retracted position. In the closed position, the roof rests on the vehicle frame, and the vehicle fitted with the roof retracting device acts as a regular car. In the retracted position, the roof is lodged in the trunk, and the vehicle fitted with the roof retracting device acts as a sports car. The trunk cover can be opened backwards so that the roof can be lodged in the trunk. The trunk cover can be opened forwards in order to lodge luggage into the trunk.

The rear shelf 2 can be in the open position or in the closed position. When the rear shelf 2 is in the open position, it makes space for the passage of the roof such that the roof can pass through smoothly between the closed position and the retracted position. When in the closed position, the rear shelf 2 can conceal the gap between the vehicle roof and the trunk cover for esthetic and aerodynamic needs.

Generally, the rear shelf 2 operates together with the roof Concretely, the extension 7 of the guiding means 1 is configured to extend transversely from one end of the guiding means 1 of the roof. And the extension 7 of the guiding means 1 is connected with the adjusting lever 4. When the guiding means 1 of the roof rotates to actuate the roof, the extension 7 of the guiding means 1 will cause rotation of the adjusting lever 4 around the principal shaft 3. The adjusting lever 4 has the protruding part 8 which can be engaged with and disengaged from the initiative lever 5, such that the rotation of the adjusting lever 4 will cause rotation of the initiative lever 5 around the principal shaft 3. The initiative lever 5 is connected to the rear shelf 2 via the L-shaped connecting lever 6. Accordingly, the initiative lever 5 can rotates to open or close the rear shelf 2 via the connecting lever 6.

According to an embodiment of the invention, the adjusting lever 4 is connected to the extension 7 of the guiding means via an adjusting device. The adjusting lever 4 is used to adjust the position between the adjusting lever 4 and the extension 7 of the guiding means. Namely, the adjusting lever 4 is used for adjusting the position between the protruding part 8 of the adjusting lever 4 and the guiding means 1 of the roof.

Figure 2:
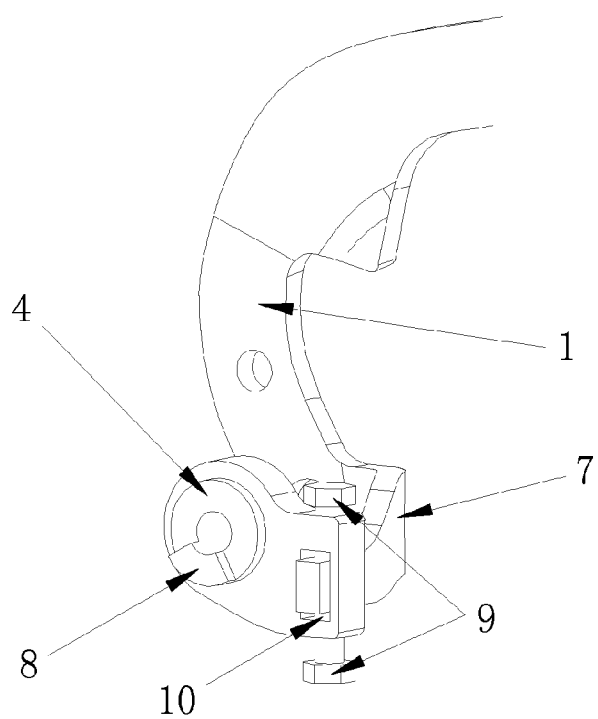
FIG. 2 is a perspective view illustrating the adjusting lever of the roof retracting device according to the present invention.

As shown in FIG. 2, the adjusting device comprises an adjusting bolt 9 and a long hole 10 formed in the adjusting lever 4. One end of the extension 7 of the guiding means is inserted into the long hole 10 and fixed by the adjusting bolt 9 which is screwed into the long hole 10. Also, the adjusting bolt 9 can be used for adjusting the position between the end of the extension 7 of the guiding means and the long hole 10. The end of the extension 7 of the guiding means can be moved upwardly and downwardly in the long hole 10 in order to adjust the position between the protruding part 8 of the adjusting lever 4 and the guiding means 1 of the roof, namely the angle between the adjusting lever 4 and the principal shaft 3.

According to an embodiment of the invention, a cam 11 is configured radially extend from the initiative lever 5. The roof retracting device comprises a resetting lever 12 which can be engaged with and disengaged from the cam 11 of the initiative lever 5. The resetting lever 12 comes into contact with the cam 11 and causes the initiative lever 5 to rotate to close the rear shelf 2 after the roof is retracted into the trunk. The roof retracting device also comprises a resetting spring which is connected to the initiative lever 5. Before the roof comes out of the trunk, the resetting lever 12 is disengaged from the cam 11 and the initiative lever 5 is rotated by the resilience force of the resetting spring to open the rear shelf 2. Preferably, the resetting lever 12 operates together with the trunk cover. For example, the resetting lever 12 operates together with the trunk cover via a cable. When the trunk cover comes into the closed position, the resetting lever 12 comes into contact with the cam 11 of the initiative lever 5 in order to close the rear shelf 2. When the trunk cover comes into the open position, the resetting lever 12 is disengaged from the cam 11 in order to open the rear shelf 2 via the resetting spring.

The operation of the roof retracting device during retraction of the roof takes place in the following manner. Details are provided with reference to FIGS. 3a-3d.

Figure 3A:
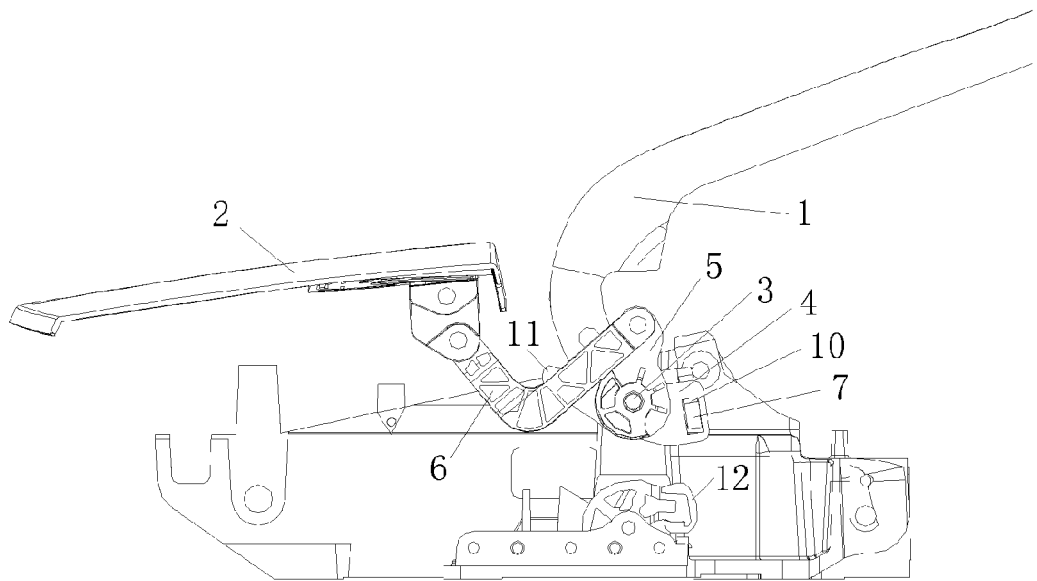
FIGS. 3a-3e illustrates the side elevations of the operation process of the roof retracting device, respectively, according to the present invention.
Figure 3B:
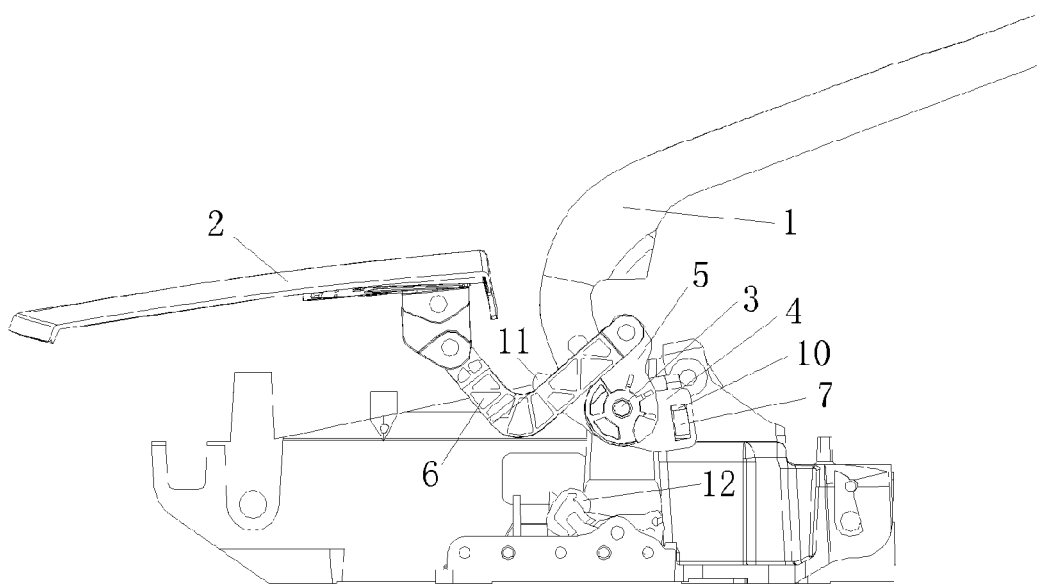

As shown in FIG. 3a, the roof is in the closed position. It is necessary firstly to open the trunk cover so that the roof can be retracted into the trunk. When the trunk cover is opened, the resetting lever 12 is rotated by a connecting mechanism, such as a cable, to a position as shown in FIG. 3b.

Figure 3C:
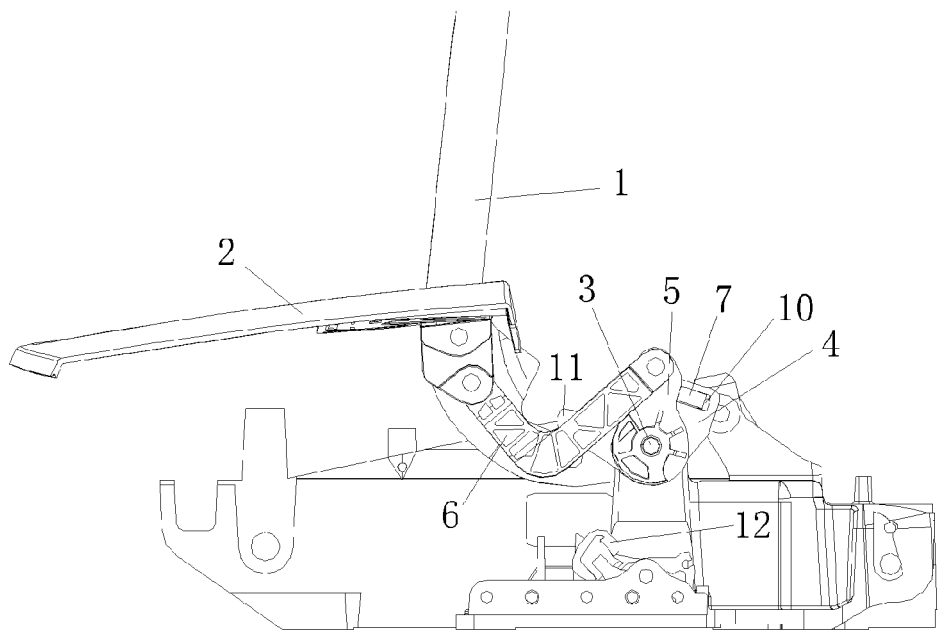

And then, a driving mechanism such as a hydraulic assembly or a pneumatic assembly is turned on to rotate the guiding means 1 of the roof around the principal shaft 3 such that the roof is folded up. During the rotation of the guiding means 1 of the roof, the extension 7 which is inserted into the long hole 10 of the adjusting lever 4 rotates the adjusting lever 4 in the anticlockwise direction. When the adjusting lever 4 is rotated to the position as shown in FIG. 3c, the protruding part 8 of the adjusting lever 4 comes into contact with the initiative lever 5 so as to actuate the initiative lever 5 to rotate synchronously. Prior to this point, the protruding part 8 is disengaged from the initiative lever 5. Namely, when the guiding means 1 of the roof rotates from the approximately horizontal position as shown in FIG. 3b to the approximately vertical position as shown in FIG. 3c, the adjusting lever 4 does not rotate the initiative lever 5 and the rear shelf 2 is still in the closed position.

With continuous rotation of the guiding means 1 of the roof, the protruding part 8 of the adjusting lever 4 comes into contact with the initiative lever 5 and actuates the initiative lever 5 to rotate. The rotation of the initiative lever 5 actuates the rear shelf 2 to displace it from the closed position to the open position via the connecting lever 6, as shown in FIG. 3d, so that the roof can be retracted into the trunk.

Figure 3D:
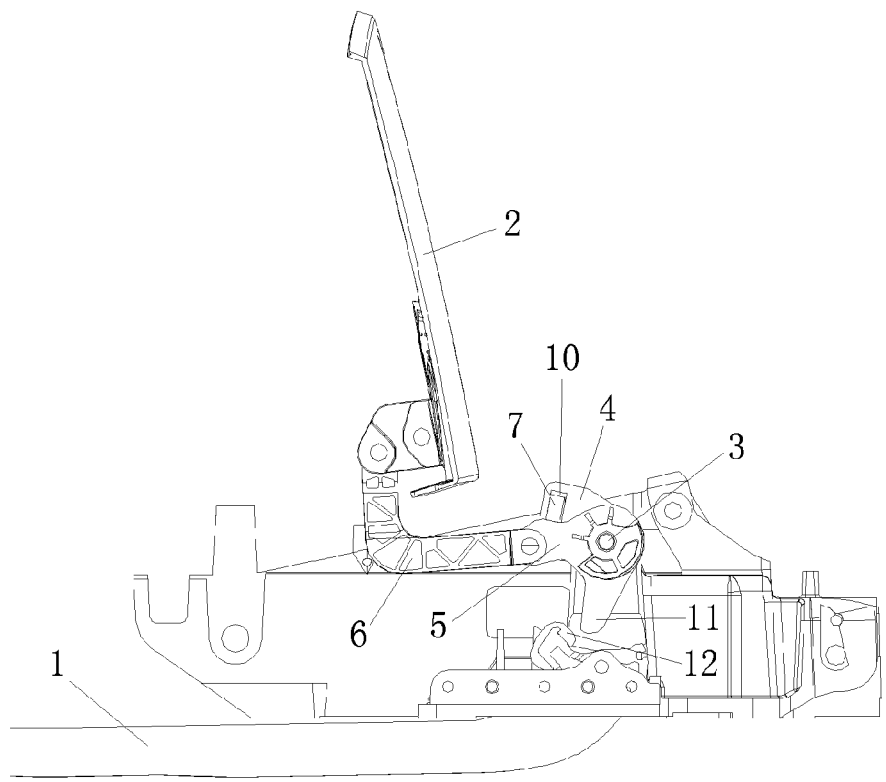
Figure 3E:
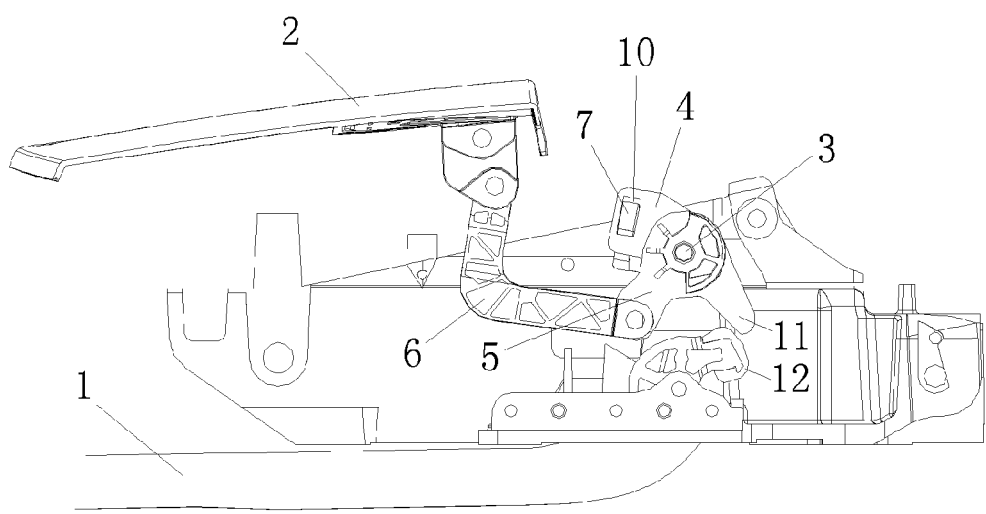

As shown in FIG. 3d-3e, the roof is completely retracted into the trunk when the guiding means 1 of the roof reaches the terminal point. Then, it is necessary to close the trunk cover. When the trunk cover displaces from the opened position to the closed position, the resetting lever 12 is rotated clockwise by a connecting mechanism such as a cable. The resetting lever 12 which is rotated comes in contact with the cam 11 of the initiative lever 5 and rotates the initiative lever 5 in the anticlockwise direction. The initiative lever 5 actuates the rear shelf 2 to displace from the open position to the closed position via the connecting lever 6. During the process, the initiative lever 5 is disengaged from the adjusting lever 4 and the adjusting lever 4 does not operate together with the initiative lever 5. When the trunk cover is completely closed, the rear cover 2 completely comes into the closed position to conceal the gap in the front of the trunk cover. Then, the retraction of the roof is finished.

Contrarily, the operation of the roof retracting device during unfolding of the roof takes place in the following manner. Details are provided with reference to FIGS. 3e-3a.

It is necessary to open the trunk cover backwards in order to unfold the roof from the trunk. During the opening process of the trunk cover, the resetting lever 12 is actuated by the trunk cover to return from the position as shown in FIG. 3e to the position as shown in FIG. 3d. Thus, the push of the resetting lever 12 against the initiative lever 5 vanishes and the initiative lever 5 is reset by the resetting spring, namely, the initiative lever 5 is rotated in the clockwise direction. The initiative lever 5 actuates the rear shelf 2 to move to the position as shown in FIG. 3d via the connecting lever 6 to make space for the passage of the roof.

And then the guiding means 1 of the roof is rotated in the clockwise direction by the driving mechanism so as to move the roof out of the trunk. At the same time, the extension 7 of the guiding means actuates the adjusting lever 4 to rotate synchronously with the guiding means 1 of the roof. The initiative lever 5 keeps in contact with the protruding part 8 of the adjusting lever 4 via the resetting spring. The initiative lever 5 rotates in the clockwise direction to move the rear shelf 2 to the closed position via the connecting lever 6. Then the initiative lever 5 rotates to the terminal point and does not rotate together with the adjusting lever 4, as shown in FIG. 3c.

The guiding means 1 of the roof continues rotating clockwise to unfold the roof. When the roof is resting on the vehicle frame, the trunk cover is closed. During the closing process of the trunk cover, the resetting lever 12 is rotated to the original position as shown in FIG. 3a. Thus, the unfolding of the roof is finished.

As shown in FIG. 2, it is convenient to adjust the position between the protruding part 8 of the adjusting lever 4 and the guiding means 1 of the roof by adjusting the position between the end of the extension 7 of the guiding means and the long hole 10 of the adjusting lever 4. Thus it is convenient to adjust the relation between the guiding means 1 of the roof and the rear cover 2. Such roof retracting device works harmoniously and reliably.

In order to achieve further improvement in the esthetics and aerodynamics of vehicles, it may be necessary to mount closure flaps on both sides of the rear shelf 2 or trunk cover. When the roof is in the closed position, the flaps are retracted in order to make space for the passage in the joint among the C-pillars and the trunk cover and the sides of the vehicle body. When the roof is in the retracted position the flaps are opened in order to conceal the gap (namely, the aforesaid joint among the C-pillars and the trunk cover and the sides of the vehicle body) on both sides of the trunk cover. The flaps can be solely actuated by a driving device or operate together with the trunk cover or the rear shelf 2.

The principles of the preferred embodiment described herein is therefore illustrative and not restrictive, the scope of the invention being indicated in the appended claims and all variations which come within the spirit and meaning of the claims are intended be embraced therein.

What is claimed is:

1. A vehicle roof retracting device comprising:
    a principal shaft;
    a guiding mechanism of the vehicle roof including an extension and being rotatable around the principal shaft for actuating the vehicle roof to displace between a closed position and a retracted position;
    a rear shelf for providing a space for the passage of the vehicle roof when the vehicle roof is open and for concealing a gap between the vehicle roof and a trunk cover when the vehicle roof is closed;
    an adjusting lever including a protruding part and being connected to the extension configured to extend transversely from one end of said guiding mechanism of the roof and actuated by the extension to rotate around said principal shaft;
    an initiative lever, wherein the protruding part is selectively engaged with or disengaged from the initiative lever for actuating the initiative lever to rotate around said principal shaft; and
    a connecting lever connecting the initiative lever and the rear shelf for displacing the rear shelf between an open position and a closed position.

2. The vehicle roof retracting device according to claim 1, wherein said adjusting lever is connected to said extension by an adjusting device for adjusting the position of said adjusting lever relative to said extension of the guiding mechanism.

3. The vehicle roof retracting device according to claim 2, wherein said adjusting device comprises:
    an adjusting bolt; and
    a long hole formed in said adjusting lever, into which one end of said extension is inserted and fixed by the adjusting bolt, wherein the adjusting bolt is configured to adjust the position between the end of the extension and the long hole.

4. The vehicle roof retracting device according to claim 3, wherein said protruding part of the adjusting lever comes into contact with said initiative lever to open said rear shelf when said guiding mechanism of the roof actuates the vehicle roof to displace from the closed position to the retracted position.

5. The vehicle roof retracting device according to claim 4, wherein said protruding part of the adjusting lever comes in contact with said initiative lever to close said rear shelf when said guiding mechanism of the roof actuates the vehicle roof to displace from the retracted position to the closed position.

6. The vehicle roof retracting device according to claim 5, wherein said roof retracting device further comprises a resetting lever selectively engaged with or disengaged from a cam of said initiative lever, wherein the resetting lever comes into contact with said cam and rotates said initiative lever in order to close said rear shelf after the roof is retracted into the trunk.

7. The vehicle roof retracting device according to claim 6, wherein said roof retracting device further comprises a resetting spring connected to said initiative lever for rotating said initiative lever to open said rear shelf when the roof does not come out of the trunk and said resetting lever is disengaged from said cam of said initiative lever.

8. The roof retracting device according to claim 7, wherein said resetting lever operates together with said trunk cover, wherein said trunk cover comes into contact with said cam of said initiative lever to close said rear shelf when said trunk cover comes into the closed position, and wherein said resetting lever is disengaged from said cam to open said rear shelf via said resetting spring when said trunk cover comes into the opened position.

9. The vehicle roof retracting device according to claim 2, wherein said protruding part of the adjusting lever comes into contact with said initiative lever to open said rear shelf when said guiding mechanism of the roof actuates the vehicle roof to displace from the closed position to the retracted position.

10. The vehicle roof retracting device according to claim 9, wherein said protruding part of the adjusting lever comes in contact with said initiative lever to close said rear shelf when said guiding mechanism of the roof actuates the vehicle roof to displace from the retracted position to the closed position.

11. The vehicle roof retracting device according to claim 10, wherein said roof retracting device further comprises a resetting lever selectively engaged with or disengaged from a cam of said initiative lever, wherein the resetting lever comes into contact with said cam and rotates said initiative lever in order to close said rear shelf after the roof is retracted into the trunk.

12. The vehicle roof retracting device according to claim 11, wherein said roof retracting device further comprises a resetting spring connected to said initiative lever for rotating said initiative lever to open said rear shelf when the roof does not come out of the trunk and said resetting lever is disengaged from said cam of said initiative lever.

13. The roof retracting device according to claim 12, wherein said resetting lever operates together with said trunk cover, wherein said trunk cover comes into contact with said cam of said initiative lever to close said rear shelf when said trunk cover comes into the closed position, and wherein said resetting lever is disengaged from said cam to open said rear shelf via said resetting spring when said trunk cover comes into the opened position.

14. The vehicle roof retracting device according to claim 1, wherein said protruding part of the adjusting lever comes into contact with said initiative lever to open said rear shelf when said guiding mechanism of the roof actuates the vehicle roof to displace from the closed position to the retracted position.

15. The vehicle roof retracting device according to claim 14, wherein said protruding part of the adjusting lever comes in contact with said initiative lever to close said rear shelf when said guiding mechanism of the roof actuates the vehicle roof to displace from the retracted position to the closed position.

16. The vehicle roof retracting device according to claim 15, wherein said roof retracting device further comprises a resetting lever selectively engaged with or disengaged from a cam of said initiative lever, wherein the resetting lever comes into contact with said cam and rotates said initiative lever in order to close said rear shelf after the roof is retracted into the trunk.

17. The vehicle roof retracting device according to claim 16, wherein said roof retracting device further comprises a resetting spring connected to said initiative lever for rotating said initiative lever to open said rear shelf when the roof does not come out of the trunk and said resetting lever is disengaged from said cam of said initiative lever.

18. The roof retracting device according to claim 17, wherein said resetting lever operates together with said trunk cover, wherein said trunk cover comes into contact with said cam of said initiative lever to close said rear shelf when said trunk cover comes into the closed position, and wherein said resetting lever is disengaged from said cam to open said rear shelf via said resetting spring when said trunk cover comes into the opened position.

19. A vehicle comprising the roof retracting device of claim 3.

20. A vehicle comprising the roof retracting device of claim 1.

21. A retracting device for a vehicle roof, comprising:
a main shaft;
a guiding mechanism including an extension and being rotatable around the main shaft for actuating the vehicle roof to displace between a closed position and a retracted position;
a rear shelf for providing a space for the passage of the vehicle roof when the vehicle roof is in the retracted position and for concealing a gap between the vehicle roof and a trunk cover when the vehicle roof is in the closed position;
an initiative lever, wherein the extension of the guiding mechanism extends transversely from one end of the guiding mechanism and is configured to drive the initiative lever to rotate around the main shaft;
a connecting lever connecting the initiative lever and the rear shelf for displacing the rear shelf between the rear shelf's open position and the rear shelf's closed position, and
an adjusting lever that includes a protruding part and is connected to the extension of the guiding mechanism, wherein the protruding part is selectively engaged with or disengaged with the initiative lever to drive the initiative lever to rotate around the main shaft.

22. The retracting device according to claim 21, further comprising an adjusting device, wherein the adjusting lever is connected to the extension of the guiding mechanism by the adjusting device for adjusting the position of the adjusting lever relative to the extension of the guiding mechanism.

23. The retracting device according to claim 21, wherein the adjusting device comprises:
an adjusting bolt; and
a long hole formed in the adjusting lever, into which one end of the extension is inserted, and fixed by the adjusting bolt, wherein the adjusting bolt is configured to adjust the position between the end of the extension and the long hole.

24. The retracting device according to claim 21, wherein the protruding part of the adjusting lever comes into contact with the initiative lever to open the rear shelf when the guiding mechanism actuates the vehicle roof to displace from the closed position to the retracted position.

25. The retracting device according to claim 21, wherein the protruding part of the adjusting lever comes into contact with the initiative lever to close the rear shelf when the guiding mechanism of the roof actuates the vehicle roof to displace from the retracted position to the closed position.

26. The retracting device according to claim 21, further comprising a resetting lever selectively engaged with or disengaged from the initiative lever in order to close the rear shelf after the roof is retracted into the trunk.

27. The retracting device according to claim 26, wherein the initiative lever comprises a cam portion selectively engaged with or disengaged from the initiative lever in order to close the rear shelf after the roof is retracted into the trunk.

28. The roof retracting according to claim 27, wherein the resetting lever is disengaged from the cam to open the rear shelf via the resetting spring when the trunk cover comes into the opened position.

29. The roof retracting according to claim 26, further comprising a resetting spring connected to the initiative lever to rotate the initiative lever to open the rear shelf when the roof does not come out of the trunk and the resetting lever is disengaged from the cam of the initiative lever.

30. The roof retracting according to claim 26, wherein the resetting lever operates together with the trunk cover, and wherein the resetting lever comes into contact with the cam of the initiative lever to close the rear shelf when the trunk cover goes into the closed position.

31. A vehicle, wherein the vehicle comprises the roof retracting device according to claim 28.

32. A vehicle, wherein the vehicle comprises the roof retracting device according to claim 27.

33. A vehicle, wherein the vehicle comprises the roof retracting device according to claim 26.

34. A vehicle, wherein the vehicle comprises the roof retracting device according to claim 21.

* * * * *